(12) United States Patent
Markowski et al.

(10) Patent No.: US 9,403,259 B2
(45) Date of Patent: Aug. 2, 2016

(54) REMOVING MATERIAL FROM A WORKPIECE WITH A WATER JET

(71) Applicant: United Technologies Corporation, Hartford, CT (US)

(72) Inventors: John E. Markowski, Berlin, CT (US); Anthony G. Ruglio, Rocky Hill, CT (US); Dipakkumar S. Patel, Billerica, MA (US); Keith E. Lockyer, Somers, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/212,126

(22) Filed: Mar. 14, 2014

(65) Prior Publication Data

US 2014/0273747 A1    Sep. 18, 2014

Related U.S. Application Data

(60) Provisional application No. 61/787,506, filed on Mar. 15, 2013.

(51) Int. Cl.

| | |
|---|---|
| *B24C 1/04* | (2006.01) |
| *G01B 11/06* | (2006.01) |
| *F01D 5/00* | (2006.01) |
| *F01D 5/06* | (2006.01) |
| *F01D 17/02* | (2006.01) |
| *G01B 21/08* | (2006.01) |
| *B24B 49/12* | (2006.01) |
| *B24B 49/04* | (2006.01) |

(52) U.S. Cl.
CPC . *B24C 1/04* (2013.01); *F01D 5/005* (2013.01); *F01D 5/06* (2013.01); *F01D 17/02* (2013.01); *G01B 11/0683* (2013.01); *G01B 21/08* (2013.01); *B24B 49/04* (2013.01); *B24B 49/12* (2013.01); *B24C 1/045* (2013.01); *F05D 2230/10* (2013.01)

(58) Field of Classification Search
CPC ........ B24B 49/04; B24B 49/12; B24B 49/14; B24C 1/04; B24C 1/045; B24C 1/08; B24C 1/083; B24C 1/086; B24C 7/0015; B24C 7/0076; F01D 5/005; F05D 2230/10; G01B 11/0625; G01B 11/0633; G01B 11/0683
USPC ............................................ 451/2, 6, 7, 8, 38
See application file for complete search history.

(56) References Cited

U.S. PATENT DOCUMENTS

| | | | |
|---|---|---|---|
| 3,017,512 A * | 1/1962 | Wolbert | 250/349 |
| 4,280,188 A | 7/1981 | Weinstein et al. | |
| 4,501,095 A | 2/1985 | Drinkuth et al. | |
| 4,611,919 A | 9/1986 | Brooks, Jr. et al. | |
| 4,748,331 A | 5/1988 | Nagao et al. | |
| 5,167,721 A | 12/1992 | McComas et al. | |

(Continued)

*Primary Examiner* — Timothy V Eley
(74) *Attorney, Agent, or Firm* — O'Shea Getz P.C.

(57) ABSTRACT

A method is provided for removing material from a workpiece using a material removal device and a measurement device. The method includes measuring a first dimension of the workpiece at a location with the measurement device. A jet of water is directed from the material removal device to the location to remove material from the workpiece at the location. A second dimension of the workpiece at the location is measured with the measurement device. The first dimension is compared to the second dimension to determine a measured thickness of the material removed from the workpiece at the location.

20 Claims, 7 Drawing Sheets

(56) References Cited

U.S. PATENT DOCUMENTS

| | | | |
|---|---|---|---|
| 5,267,016 A | 11/1993 | Meinzer et al. | |
| 5,281,798 A | 1/1994 | Hamm et al. | |
| 6,052,191 A * | 4/2000 | Brayden et al. | 356/630 |
| 7,121,922 B2 * | 10/2006 | van Brug | 451/6 |
| 7,264,538 B2 | 9/2007 | Hood et al. | |
| 7,556,554 B2 * | 7/2009 | Brug et al. | 451/2 |
| 7,725,210 B2 * | 5/2010 | Hoebel et al. | 700/166 |
| 7,824,730 B2 | 11/2010 | Ruglio et al. | |
| 7,896,726 B1 * | 3/2011 | Miller et al. | 451/2 |
| 8,151,613 B2 * | 4/2012 | Ishikura et al. | 72/53 |
| 8,315,834 B2 * | 11/2012 | Gimelfarb et al. | 702/171 |
| 8,691,322 B2 * | 4/2014 | Zierhut et al. | 427/9 |
| 2004/0229546 A1 * | 11/2004 | Hansen | 451/6 |

* cited by examiner

REMOVING MATERIAL FROM A WORKPIECE WITH A WATER JET

CROSS-REFERENCE TO RELATED APPLICATIONS

This application claims priority to U.S. Provisional Patent Appln. No. 61/787,506 filed Mar. 15, 2013, which is hereby incorporated herein by reference in its entirety.

BACKGROUND OF THE INVENTION

1. Technical Field

This disclosure relates to removing material from a workpiece such as, for example, a turbine engine component.

2. Background Information

A material such as a coating may be removed from a workpiece during manufacture, repair or replacement of a part. For high precision parts, such as turbine engine components, the thickness of the removed material may affect whether the part is in conformance with a specification for that part. The part therefore is typically measured following complete removal of the material to make this determination.

Manual measurement instruments such as micrometers have been used to measure an overall dimension of a part. Such instruments, however, are susceptible to gauge error, user error or variation in the technique of using the measurement instrument. It may also be difficult to visually differentiate between a coating and its underlying substrate. In addition, because the part is often measured with the measurement instrument and/or visually inspected after removing the material, too much of the material may have already been removed from the part before its measurement. The part therefore may no longer conform with its specification.

There is a need in the art for a more accurate technique and system for removing material from a workpiece.

SUMMARY OF THE DISCLOSURE

According to an aspect of the invention, a method is provided for removing material from a workpiece using a material removal device and a laser measurement device. The method includes measuring a first dimension of the workpiece at a location with the laser measurement device. A jet of water is directed from the material removal device to the location to remove material from the workpiece at the location. A second dimension of the workpiece at the location is measured with the laser measurement device. The first dimension is compared to the second dimension to determine a measured thickness of the material removed from the workpiece at the location.

According to another aspect of the invention, a method is provided for removing material from a workpiece using a measurement device and a water jet stripping device with a nozzle. The method includes remotely measuring a first dimension of the workpiece at a location with the measurement device. One or more focused streams of water are directed from the nozzle to the location to remove material from the workpiece at the location. A second dimension of the workpiece is remotely measured at the location with the measurement device. The first dimension is compared to the second dimension to determine a measured thickness of the material removed from the workpiece at the location.

The measuring of the first dimension and/or the second dimension may each include projecting a laser beam from the laser measurement device to the location. A reflection of the laser beam may be detected off of the workpiece with the laser measurement device. The respective dimension may be determined based on a value of the detected reflection.

The measuring of the first dimension and/or the second dimension may each include projecting a plurality of laser beams from the laser measurement device to the location. The laser beams may include a first laser beam and a second laser beam. Reflections of the first and second laser beams may be detected off of the workpiece with the laser measurement device. The respective dimension may be determined based on values of the detected reflections. The first and the second laser beams may substantially converge at the location.

The jet of water may be formed from substantially pure water (e.g., tap water or distilled water). Alternatively, the jet of water may be formed from water that is mixed with at least one abrasive (e.g., baking soda).

The directing of the jet of water may include directing one or more focused streams of water from a nozzle of the material removal device to the location. The directing of the jet of water may also include rotating the nozzle about an axis as the one or more focused streams of the water are directed from the nozzle.

The measured thickness may be compared to a predetermined thickness. A jet of water may be directed from the material removal device to the location to remove additional material from the workpiece at the location where the measured thickness is less than the predetermined thickness.

A first temperature of the workpiece may be measured approximately when the first dimension is being measured. A second temperature of the workpiece may be measured approximately when the second dimension is being measured. Thermal contraction or expansion of the workpiece may be at least partially compensated for during the comparing of the first dimension to the second dimension using the first and the second temperatures.

A third dimension of the workpiece may be measured at a second location with the laser measurement device. A jet of water may be directed from the material removal device to the second location to remove material from the workpiece at the second location. A fourth dimension of the workpiece may be measured at the second location with the laser measurement device. The third dimension may be compared to the fourth dimension to determine a second measured thickness of the material removed from the workpiece at the second location.

The first dimension and/or the second dimension may be remotely measured with a laser measurement device.

The foregoing features and the operation of the invention will become more apparent in light of the following description and the accompanying drawings.

DETAILED DESCRIPTION OF THE INVENTION

Figure 1:
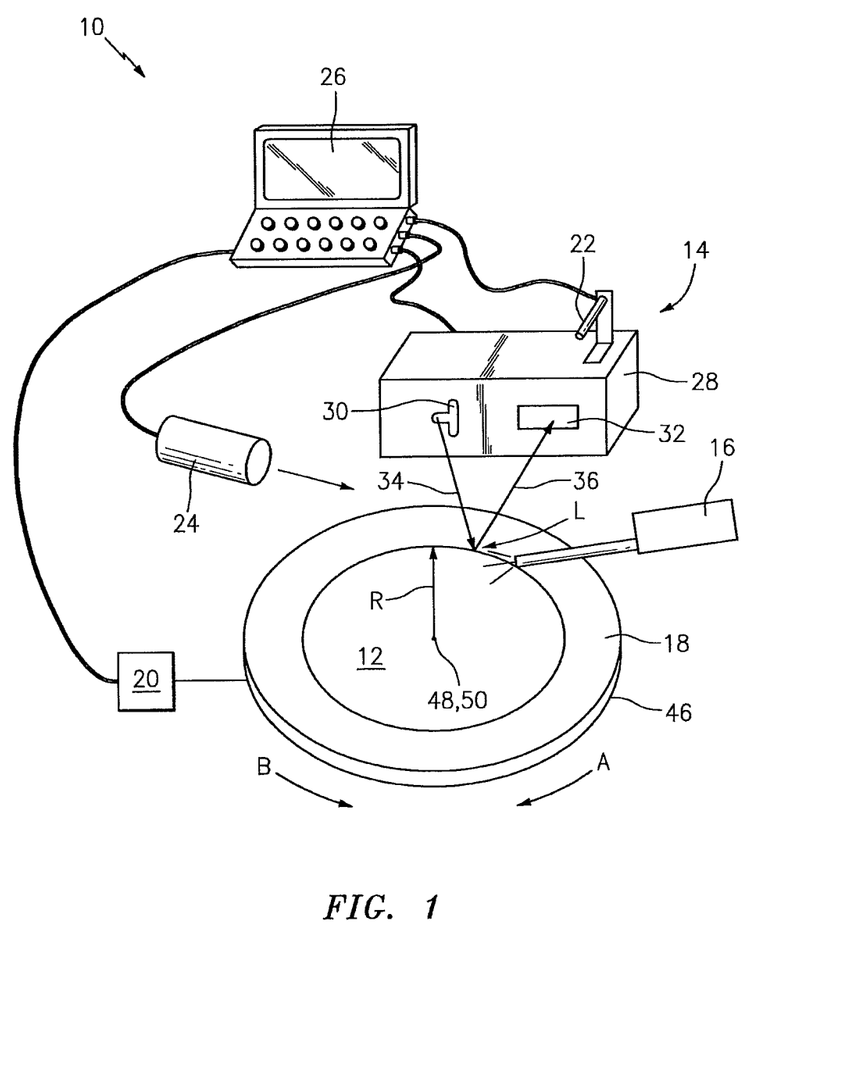
FIG. 1 is a schematic illustration of a system for removing material from a workpiece.

FIG. 1 is schematic illustration of a system 10 for removing material from a workpiece 12 such as, for example, a coated turbine engine component; e.g., a disk or a rotor blade. The system 10 includes a non-contact measurement device 14, a material removal device 16, a workpiece support 18, a position sensor 20, one or more temperature sensors 22 and 24, and a controller 26.

The measurement device 14 may be a laser measurement device. The measurement device 14 includes a laser gauge 28 having a laser source 30 and a laser sensor 32. The laser source 30 is configured to project a laser beam 34 to a location L (e.g., $L_1$ or $L_2$) on a surface of the workpiece 12. The laser sensor 32 is configured to detect a reflection 36 of the laser beam 34 off of the surface of the workpiece 12. The laser gauge 28 is configured to provide data indicative of one or more characteristics of the detected reflection (e.g., signal strength) to the controller 26.

Figure 2:
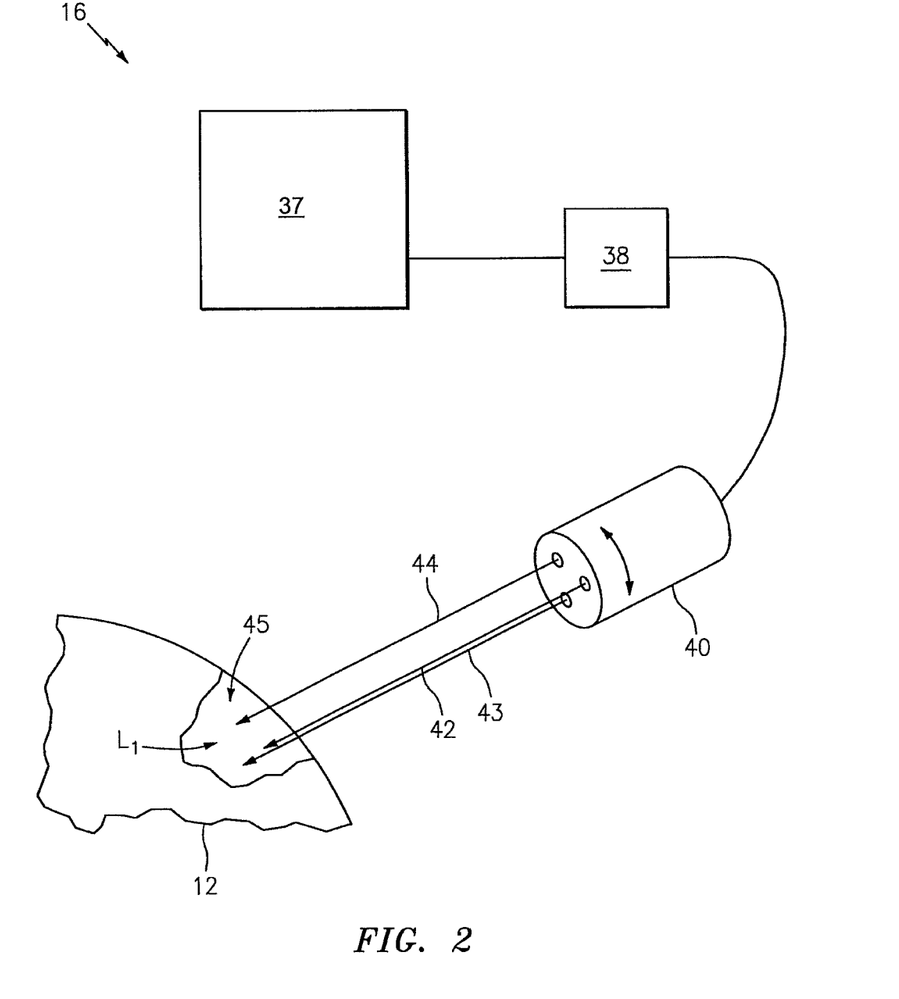
FIG. 2 is a schematic illustration of a material removal device for the system of FIG. 1.

Referring to FIG. 2, the material removal device 16 may be a water jet stripping device. The material removal device 16 includes a water reservoir 37, a pump 38 and a nozzle 40. The water reservoir 37 is configured to contain water, which may be substantially pure water (e.g., tap water or distilled water) or treated water (e.g., water mixed with an abrasive such as, but not limited to, baking soda). The pump 38 is configured to pump the water from the reservoir 37 to the nozzle 40. The nozzle 40 is configured to direct one or more focused streams 42-44 of pressurized water (e.g., one or more jets of water) to a desired location (e.g., the location $L_1$) on the workpiece 12. The nozzle 40 may also be configured to rotate about an axis to distribute the water within a material removal region 45 on the workpiece 12. The force of the water impacting against the workpiece 12 may remove material from the workpiece 12 in the material removal region 45.

Referring to FIG. 1, the workpiece support 18 includes a turntable 46 and an actuator (not shown). The actuator is configured to rotate the turntable 46 in a direction of arrow A or in a direction of arrow B. The actuator may also be configured to move the workpiece 12 vertically up and down.

The position sensor 20 may be a rotational position sensor such as, for example, a RIM device encoder with a friction contact wheel that engages an underside of the turntable 46. The position sensor 20 is configured to track the rotational position of the turntable 46 relative to a polar coordinate system. The position sensor 20 is also configured to provide data to the controller 26 indicative of the rotational position of the turntable 46, which enables the controller 26 to track the location L on the workpiece 12 as the turntable 46 rotates.

The temperature sensor 22 may be an ambient temperature gauge such as, for example, a thermocouple. The temperature sensor 22 is configured to measure a temperature of an environment in which the system 10 is located. The temperature sensor 24 may be a non-contact temperature gauge such as, for example, an infrared temperature gauge. The temperature sensor 24 is configured to measure a temperature of the workpiece 12 at the location L. The temperature sensors 22 and 24 are also configured to provide data indicative of the measured temperatures to the controller 26. This data may be processed by the controller 26 to track and determine changes in the size of the workpiece 12 as described below in further detail.

The controller 26 may be implemented using hardware, software, or a combination thereof. The hardware may include one or more processors, memory, analog and/or digital circuitry, etc. The controller 26 is in signal communication (e.g., hardwired or wirelessly connected) with the measurement device 14, the material removal device 16, the workpiece support 18, the position sensor 20, and the temperature sensors 22 and 24.

Figure 3:
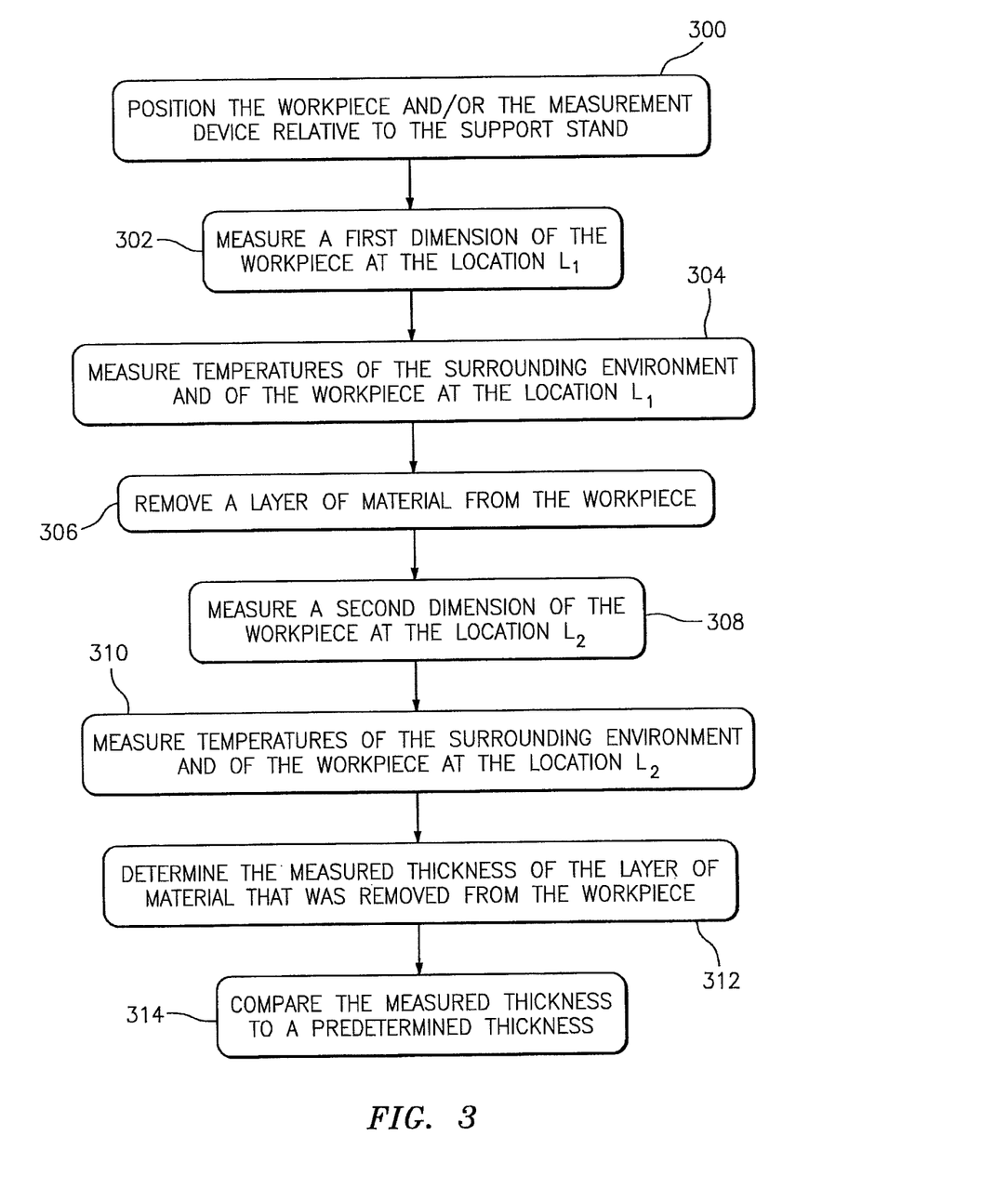
FIG. 3 is a flow diagram of a method for removing material from the workpiece with the system of FIG. 1.
Figure 4:
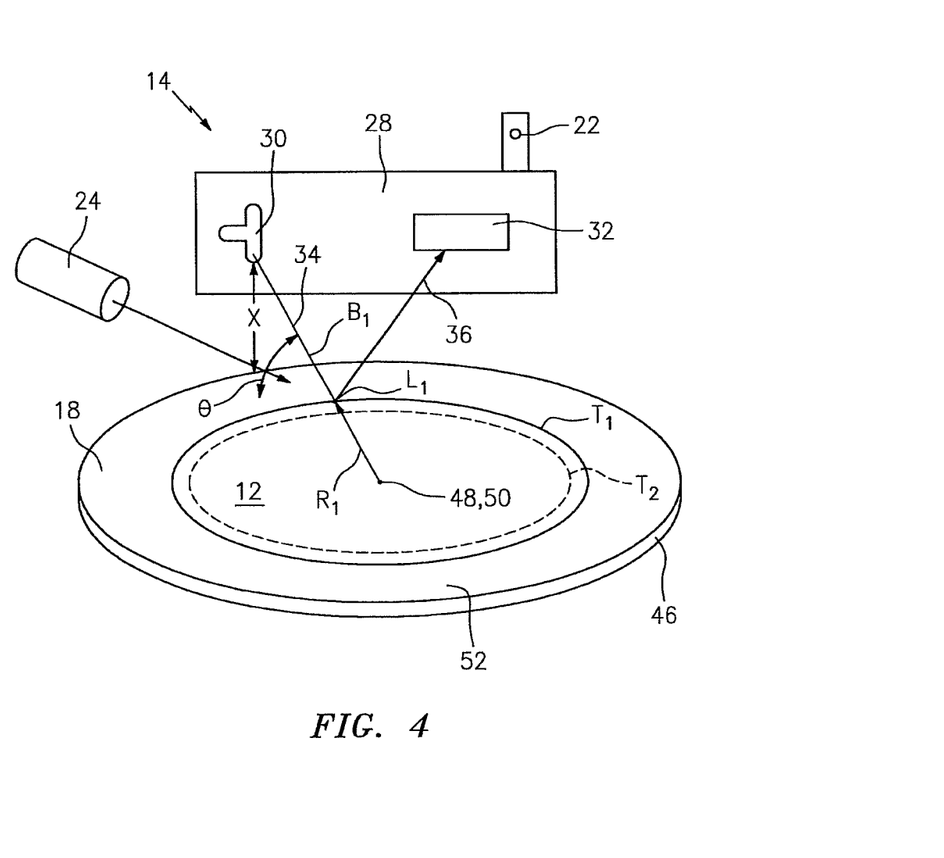
FIG. 4 is a schematic illustration of a portion of the system of FIG. 1 during operation.

FIG. 3 is a flow diagram of a method for removing material from the workpiece 12 using the system 10. Referring to FIGS. 3 and 4, in step 300, the workpiece 12 and the measurement device 14 are positioned relative to the support stand 18. For example, a center 48 of the workpiece 12 may be aligned with a center 50 of the turntable 46, which locates the workpiece 12 relative to the turntable 46. The laser source 30 is positioned at a height X above and an angle θ relative to a top surface 52 of the turntable 46. The controller 26 may use the height X and the angle θ along with the rotational position of the turntable 46 and the location $L_1$ to create a three dimensional polar coordinate system for the workpiece 12.

In step 302, a first dimension (e.g., a radius $R_1$) of the workpiece 12 is measured at (e.g., on, adjacent or proximate) the location $L_1$. The measurement device 14, for example, measures a characteristic of the reflection 36 such as its wavelength. This characteristic may be indicative of a first distance from the laser source 30 to the workpiece 12 at the location $L_1$ to the laser sensor 32; i.e., the combined length of the laser beam 34 and the reflection 36. The controller 26 (see FIG. 1) processes this distance within the coordinate system to determine the first dimension of the workpiece 12; e.g., the radius $R_1$ of the workpiece 12. Alternatively, the controller 26 may use the first distance or another distance as the first dimension.

In step 304, the temperature sensor 22 measures a first temperature of the environment surrounding the workpiece 12. In addition or alternatively, the temperature sensor 24 measures a second temperature of the workpiece 12 at the location $L_1$.

Referring to FIGS. 1 to 3, in step 306, a first layer of material is removed from the workpiece 12. The material removal device 16, for example, removes material from workpiece 12 at the location $L_1$ by directing one or more focused streams 42-44 of water (e.g., jets of water) against the surface of the workpiece 12 at the location $L_1$. The material removal device 16 may also remove material from other locations as the turntable 46 rotates the workpiece 12. The removal of material from these locations may cumulatively result in the removal of the first layer of material from (e.g., around the periphery of) the workpiece 12. Alternatively, the material removal device 16 may be used to remove material from one or more discrete locations.

Figure 5:
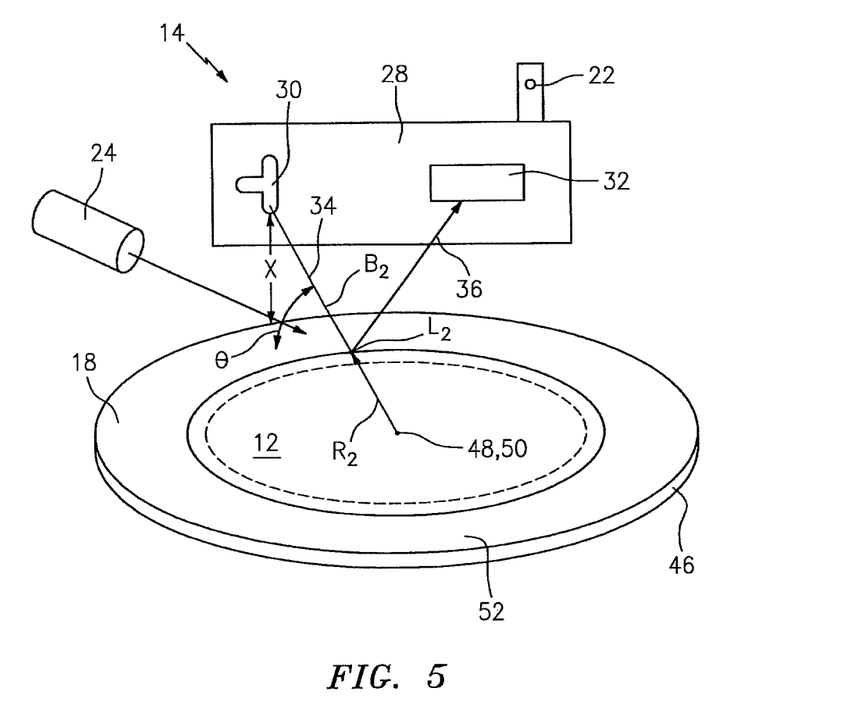
FIG. 5 is another schematic illustration of a portion of the system of FIG. 1 during operation.
Figure 6:
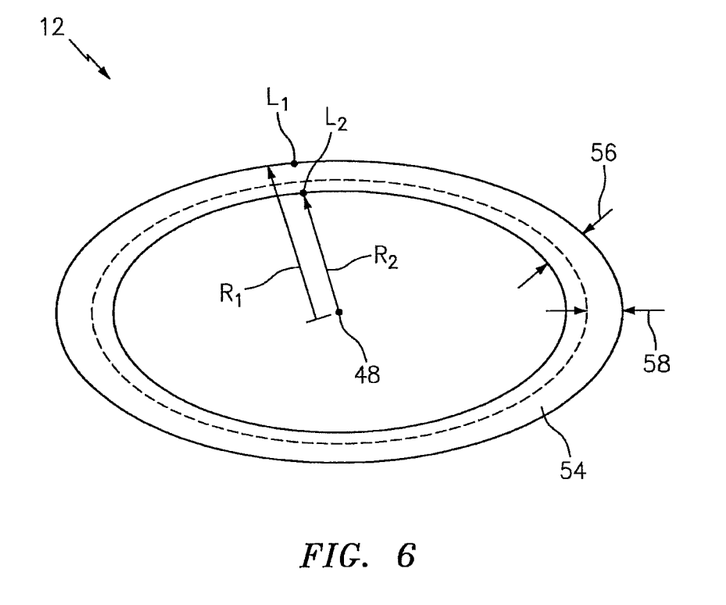
FIG. 6 is a schematic overlaid illustration of the workpiece before, during and after the removal of material therefrom.

Referring to FIGS. 3 and 5, in step 308, a second dimension (e.g., radius $R_2$) of the workpiece 12 is measured at the location $L_2$ after (or during) the performance of the material removal step 306. The measurement device 14, for example, measures a characteristic of the reflection 36 such as its wavelength. This characteristic may be indicative of a second distance from the laser source 30 to the workpiece 12 at the location $L_2$ to the laser sensor 32; i.e., the combined length of the laser beam 34 and the reflection 36. The controller 26 (see FIG. 1) processes this distance within the coordinate system to determine the second dimension of the workpiece 12; e.g., the radius $R_2$ of the workpiece 12. Alternatively, the controller 26 may use the second distance or another distance as the second dimension. Referring to FIG. 6, the second dimension (e.g., radius $R_2$) is different (e.g., smaller) than the first dimension (e.g., radius $R_1$).

Referring to FIGS. 3 and 5, in step 310, the temperature sensor 22 again measures a first temperature of the environment surrounding the workpiece 12. In addition or alternatively, the temperature sensor 24 again measures a second temperature of the workpiece 12 at the location $L_2$. Typically, these temperatures will be different (e.g., greater or less) than those measured in the step 304 because the water used in the material removal step 306 may cool the workpiece 12 where the water has a relatively low temperature, or heat the workpiece 12 as it impacts against the workpiece 12.

Referring to FIGS. 1, 3 and 6, in step 312, the controller 26 determines a measured thickness of the first layer 54 of material that was removed from the workpiece 12 during the step 306. The controller 26, for example, may subtract the second dimension (e.g., the radius $R_2$) from the first dimension (e.g., the radius $R_1$) to determine a first thickness value 56. This first thickness value 56 may be set as the measured thickness. Alternatively, the first thickness value 56 may be processed by the controller 26 to account for thermal contraction (or expansion) of the workpiece 12 during the material removal step 306. For example, a temperature difference between the measured first temperatures or a temperature difference between the measured second temperatures may be input into a lookup table to provide thermal contraction (or expansion) information. Such thermal contraction (or expansion) information may relate how much a workpiece contracts (or expands) as a result of a certain drop (or rise) in temperature. The first thickness value 56 may be processed with the thermal contraction (or expansion) information to determine a second thickness value 58 that substantially accounts for the thermal contraction (or expansion) of the workpiece 12. This second thickness value 58 may be set as the measured thickness. The difference between the first and the second thickness values 56 and 58 is illustrated in FIG. 6.

For purposes of measuring the temperature of the workpiece 12, the temperature sensor 22 will initially be more accurate than the temperature sensor 24. Accordingly, the controller 26 may utilize the temperature difference between the measured first temperatures to account for thermal contraction (or expansion) until the temperature sensors 22 and 24 provide substantially the same readings. Thereafter, the controller 26 may utilize the temperature difference between the measured second temperatures to account for thermal contraction (or expansion).

In step 314, the controller 26 compares the measured thickness to a predetermined thickness. This predetermined thickness may correspond to an amount of material to be removed from the workpiece 12; e.g., a thickness of at least a part of a worn or previously applied coating or layer on a base substrate of the workpiece 12. Where the measured thickness is less than the predetermined thickness, the system 10 may repeat one or more of the steps 302, 304, 306, 308, 310 and 312 to remove and measure the thickness of a second layer of material. When the measured thickness is substantially equal to or greater than the predetermined thickness, the system 10 may terminate this method.

In some embodiments, one or more steps of the foregoing method may be repeated to remove material from one or more additional locations on the workpiece.

In some embodiments, the lookup table with the thermal contraction (or expansion) information may be generated before, during or after the foregoing method. Referring to FIGS. 1 and 4, for example, the workpiece 12 may be rotated on the turntable 46 as the material removal device 16 is operated without removing material. As the material removal device 16 cools (or heats) the workpiece 12, a location such as the location $L_1$ is tracked over temperature changes with the rotational position. For example, the workpiece 12 may have a first radius at temperature $T_1$ and a second radius at temperature $T_2$. The material removal device 16 may be turned off, and the workpiece 12 is allowed to warm (or cool) as the turntable 46 continues to turn. The location $L_1$ is tracked with as temperature rises (or falls). This tracking of the changes in the temperature may occur for a number of cycles to ensure accuracy. The controller 26 may determine the thermal contraction (or expansion) information based on the tracked changes in the radius of the workpiece 12 as the temperatures fell and/or rose.

Figure 7:
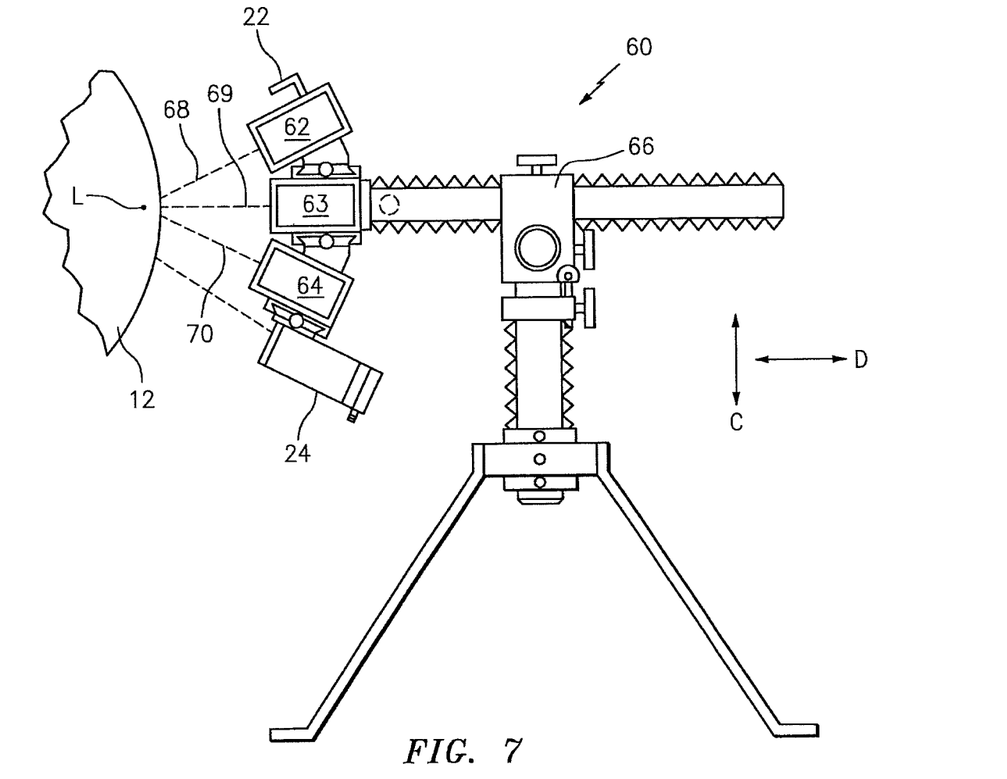
FIG. 7 is an illustration of a laser gauge assembly.

FIG. 7 illustrates a laser gauge assembly 60. The laser gauge assembly 60 includes a plurality of laser gauges; e.g., a first laser gauge 62, a second laser gauge 63 and a third laser gauge 64. Each of these laser gauges 62-64 may be configured similar to the laser gauge 28 of FIG. 1. In addition, the temperature sensors 22 and 24 are also provided. The laser gauges 62-64 and the temperature sensors 22 and 24 are mounted on a stand 66, which allows movement of the laser gauges 62-64 and the temperature sensors 22 and 24 along an axis C and/or along an axis D. The stand 66 may also be rotated about the axis C. The laser gauges 62-64 are respectively configured to project laser beams 68-70 onto the surface of the workpiece 12. These laser beams 68-70 may converge at the location L, which may be on or inside the workpiece 12.

Figure 8:
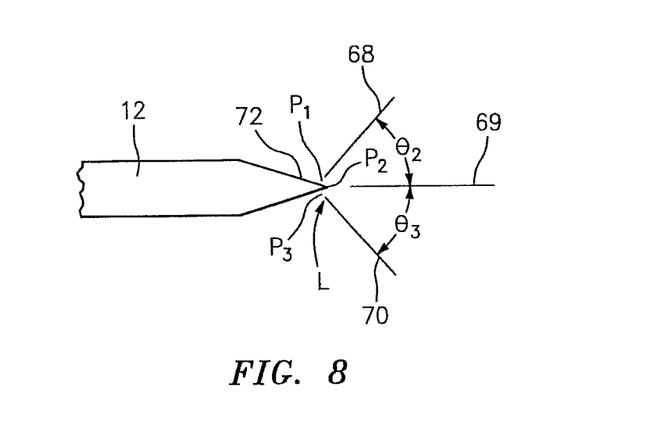
FIG. 8 is an illustration of an enlarged portion of a workpiece.

The laser gauge assembly 60 may be used to measure changes in size of sharp edge objects. Referring to FIG. 8, the workpiece 12 may include a sharp edge 72 such as, for example, a knife edge seal. The laser beams 68-70 are projected at different angles on to the sharp edge 72 such that the laser beam 68 shines on the location $P_1$, the laser beam 69 shines on the location $P_2$, and the laser beam 70 shines on the location $P_3$. The laser beam 68 is projected at an angle $\theta_2$ relative to the laser beam 69. The laser beam 70 is projected at an angle $\theta_3$ relative to the laser beam 69. The discrete locations $P_1$, $P_2$, and $P_3$ are located closely together proximate the location L. In this way, when the workpiece 12 is rotated on the turntable 46 (see FIG. 1), the sharp edge 72 will be able to reflect the laser beam back to the respective sensor of at least one of the laser gauges 62-64. This feature aids in allowing the laser gauge assembly 60 to continue to monitor changes in thickness at the sharp edge 72 even when the sharp edge may move during rotation out of the line of sight of one laser gauges 62-64.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A method for removing material from a turbine engine component using a material removal device and a laser measurement device, the method comprising:
    measuring a first dimension of the turbine engine component at a location with the laser measurement device;
    directing a jet of water from the material removal device to the location to remove material from the turbine engine component at the location;
    measuring a second dimension of the turbine engine component at the location with the laser measurement device; and comparing the first dimension to the second dimension to determine a measured thickness of the material removed from the turbine engine component at the location;

wherein the directing of the jet of water includes directing one or more focused streams of water from a nozzle of the material removal device to the location; and wherein the directing of the jet of water further includes rotating the nozzle about an axis as the one or more focused streams of water are directed from the nozzle, the axis being substantially parallel with the one or more focused streams of water directed from the nozzle.

2. The method of claim 1, wherein the measuring of at least one of the first dimension and the second dimension each comprises:

projecting a laser beam from the laser measurement device to the location;

detecting a reflection of the laser beam off of the turbine engine component with the laser measurement device; and determining the respective dimension based on a value of the detected reflection.

3. The method of claim 1, wherein the measuring of at least one of the first dimension and the second dimension each comprises:

projecting a plurality of laser beams from the laser measurement device to the location, wherein the laser beams include a first laser beam and a second laser beam;

detecting reflections of the first and the second laser beams off of the turbine engine component with the laser measurement device; and determining the respective dimension based on values of the detected reflections.

4. The method of claim 3, wherein the first and the second laser beams substantially converge at the location.

5. The method of claim 1, wherein the jet of water consists essentially of substantially pure water.

6. The method of claim 1, wherein the jet of water includes an abrasive.

7. The method of claim 1, wherein the one or more focused streams of water comprises a plurality of focused streams of water.

8. The method of claim 1, further comprising:

comparing the measured thickness to a predetermined thickness; and directing a jet of water from the material removal device to the location to remove additional material from the turbine engine component at the location where the measured thickness is less than the predetermined thickness.

9. The method of claim 1, further comprising:

measuring a first temperature of the turbine engine component approximately when the first dimension is being measured;

measuring a second temperature of the turbine engine component approximately when the second dimension is being measured; and at least partially compensating for thermal contraction or expansion of the turbine engine component during the comparing of the first dimension to the second dimension using the first and the second temperatures.

10. The method of claim 1, further comprising:

measuring a third dimension of the turbine engine component at a second location with the laser measurement device;

directing a jet of water from the material removal device to the second location to remove material from the turbine engine component at the second location;

measuring a fourth dimension of the turbine engine component at the second location with the laser measurement device; and comparing the third dimension to the fourth dimension to determine a second measured thickness of the material removed from the turbine engine component at the second location.

11. A method for removing material from a turbine engine component using a measurement device and a water jet stripping device with a nozzle, the method comprising:

remotely measuring a first dimension of the turbine engine component at a location with the measurement device;

directing a plurality of focused streams of water from the nozzle to the location and rotating the nozzle about an axis as the plurality of focused streams of the water are directed from the nozzle to remove material from the turbine engine component at the location, wherein the axis has a trajectory that is coincident with the turbine engine component;

remotely measuring a second dimension of the turbine engine component at the location with the measurement device; and comparing the first dimension to the second dimension to determine a measured thickness of the material removed from the turbine engine component at the location;

wherein at least one of the first dimension and the second dimension are each remotely measured with a laser measurement device.

12. The method of claim 11, wherein the measuring of at least one of the first dimension and the second dimension each comprises:

projecting a laser beam from the laser measurement device to the location;

detecting a reflection of the laser beam off of the turbine engine component with the laser measurement device; and determining the respective dimension based on a value of the detected reflection.

13. The method of claim 11, wherein the measuring of at least one of the first dimension and the second dimension each comprises:

projecting a plurality of laser beams from the laser measurement device to the location, wherein the laser beams include a first laser beam and a second laser beam;

detecting reflections of the first and the second laser beams off of the turbine engine component with the laser measurement device; and determining the respective dimension based on values of the detected reflections.

14. The method of claim 13, wherein the first and the second laser beams substantially converge at the location.

15. The method of claim 11, further comprising:

comparing the measured thickness to a predetermined thickness; and directing one or more focused streams of water from the nozzle to the location to remove additional material from the turbine engine component at the location where the measured thickness is less than the predetermined thickness.

16. The method of claim 11, further comprising:

measuring a first temperature of the turbine engine component approximately when the first dimension is being measured;

measuring a second temperature of the turbine engine component approximately when the second dimension is being measured; and at least partially compensating for thermal contraction or expansion of the turbine engine component during the comparing of the first dimension to the second dimension using the first and the second temperatures.

17. The method of claim 11, further comprising:
   measuring a third dimension of the turbine engine component at a second location with the measurement device;
   directing one or more focused streams of water from the nozzle to the second location to remove material from the turbine engine component at the second location;
   measuring a fourth dimension of the turbine engine component at the second location with the measurement device; and
   comparing the third dimension to the fourth dimension to determine a second measured thickness of the material removed from the turbine engine component at the second location.

18. A method for removing material from a turbine engine component using a measurement device and a water jet stripping device with a nozzle, the method comprising:
   remotely measuring a first dimension of the turbine engine component at a location with the measurement device;
   directing one or more focused streams of water from the nozzle to the location and rotating the nozzle about an axis as the one or more focused streams of the water are directed from the nozzle to remove material from the turbine engine component at the location, wherein the axis has a trajectory that is coincident with the turbine engine component;
   remotely measuring a second dimension of the turbine engine component at the location with the measurement device; and
   comparing the first dimension to the second dimension to determine a measured thickness of the material removed from the turbine engine component at the location;
   wherein the measurement device and the nozzle are located on a same side of the turbine engine component; and
   wherein the turbine engine component comprises a component and a coating on the component, and the material removed from the turbine engine component comprises at least a portion of the coating.

19. The method of claim 18, wherein the turbine engine component comprises a rotor disk.

20. The method of claim 18, wherein the turbine engine component comprises a rotor blade.

* * * * *